1,523,859

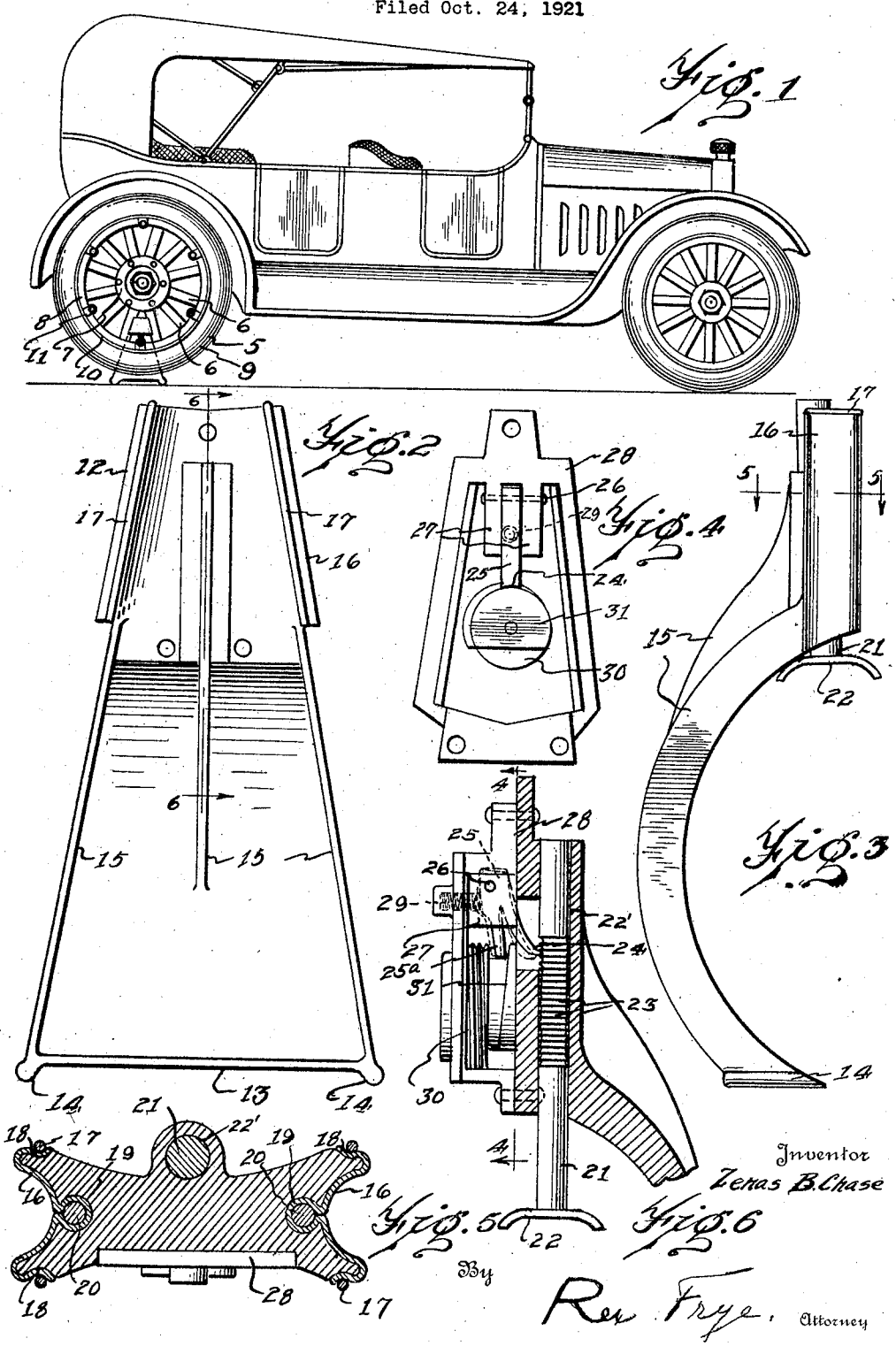
Jan. 20, 1925.
Z. B. CHASE
1,523,859
WHEEL JACK AND LOCK
Filed Oct. 24, 1921
Inventor
Zenas B. Chase
By Rex Frye, Attorney Patented Jan. 20, 1925.

UNITED STATES PATENT OFFICE.

ZENAS B. CHASE, OF WINDSOR, ONTARIO, CANADA.

WHEEL JACK AND LOCK.

Application filed October 24, 1921. Serial No. 509,786.

*To all whom it may concern:*

Be it known that I, ZENAS B. CHASE, a citizen of the United States, residing at Windsor, in the Province of Ontario, Canada, have invented certain new and useful Improvements in Wheel Jacks and Locks, of which the following is a specification.

This invention relates to improvements in lockable automobile wheel jacks and has for its primary object the provision of an automatic jack that can be quickly inserted between two spokes of a wheel desired to be raised and be carried around by the wheel until one edge of its base contacts the ground, whereupon a slight further movement of the vehicle will swing the jack over until it rests full upon its base, elevating the wheel and adjacent parts in so doing.

A further object is to provide a wheel jack that can be quickly locked in position on a wheel and which cannot be moved therefrom except by a person using an appropriate key, the free edge of the jack extending beyond the tire of the wheel and rendering the car incapable of being driven or steered until it has been removed, except with a bumpy, uneven motion that will attract the attention of bystanders, thereby effectively discouraging the use of the car by unauthorized persons.

A further object is to provide a lockable automatic jack that is light, durable, and comparatively inexpensive to produce, and which can be advantageously cast or made of reinforced sheet metal.

A further object is to so arrange the base of my improved jack as to permit its use as a mud hook when the automobile is passing through soft spots in a road, the jack being readily positioned between the wheel spokes by a person standing on the running board.

With the above and other objects in view which will readily appear as the invention is better understood, my invention consists in the novel construction and arrangement of parts to be hereinafter more fully described and particularly pointed out in the subjoined claims.

Reference is to be had to the accompanying drawings illustrating a preferred embodiment of my invention and wherein similar reference numerals designate similar parts throughout the several views.

In the drawings:—

Fig. 1 is a side elevation of an automobile having one wheel raised by the employment of my improved wheel jack;

Fig. 2 is a rear elevation of the jack removed from the car;

Fig. 3 is a side elevation thereof;

Fig. 4 is a detail section taken substantially on the line 4—4 of Fig. 6;

Fig. 5 is a cross section on the line 5—5 of Fig. 3, and

Fig. 6 is a detail sectional view on the line 6—6 of Fig. 2.

Referring to the drawings, the numeral 5 designates an automobile wheel having radial spokes 6 extending from its hub 7 to the felloe 8. The tire 9 may be suitably fixed upon the felloe in any approved manner, the construction shown being a conventional one to illustrate a demountable rim 10 carrying the tire and held in place by removable lugs 11.

When it is desired to remove the tire, as after a puncture or blowout, my improved jack may be inserted through the spokes 6 to the inner side of the wheel and the tapered head 12 of the jack wedged between two spokes then near a horizontal plane, the automobile being then slowly driven either forwardly or rearwardly as needed to bring the edge of the base of the jack against the ground, and then a little further to bring the entire base flush with the ground, the latter movement swinging the jack about the edge of its base as a fulcrum and elevating the wheel to which it is attached. The base 13 of the jack is formed with wide spaced feet 14 having rounded lower portions to facilitate the swinging movement of the jack above described, and so disposed relatively to the head 12 as to be equi-distant from the line of support of the wheel. This construction gives a wide, strong support that will rigidly maintain the wheel in raised position and resist tendency of the vehicle to roll off the jack even when the ground beneath the car is inclined. The width of the base is over twice that of the jacks in general use today, and the feet 14 are of sufficient length to bridge cobblestones, holes, and the like, such as are ordinarily met with in city and suburban driving.

Above the feet 14 the body of the jack is curved rearwardly to an extent sufficient to clear the usual tires and felloes, and then curves forwardly to a line substantially above the center line of the feet 14, at which point it extends vertically to form the head 12 previously referred to. The body portion of the jack may be made of any desired material, and it is to be understood that the illustrated embodiment is merely for purposes of exemplification. The drawing shows a construction I prefer to use when the jack is to be cast, and has the body, feet and head in one piece with reinforcing ribs 15 bracing the connection of the head and body and having widened edge portions that stiffen the casting against crushing and end thrust.

The head 12 is formed with its sides tapered to a degree to fit between adjacent spokes of the wheels in ordinary use, and the sides are concaved substantially as shown in Fig. 4 to encircle the wheel spokes to assure a snug fit. To prevent scratching of the paint on the spokes I provide a protective sheet of leather, canvas or the like, arranged to fit the concave portion of the head 12, which is preferably held on by clamps 17 of spring steel pressing the leather sheet 16 in grooves 18 on the front and rear faces of the head. To insure a snug fit of the leather in the concave portion I preferably loop the central portion of the leather in a key-hole shaped slot 19 (see Fig. 5) and then drive a tapered plug 20 into such loop to draw the leather taut in all directions. The depth of the insertion of the plug 20 determines the degree of stretch of the leather.

In the illustrated embodiment the lock comprises a longitudinally movable locking bolt 21 having a head 22 adapted to contact or partially encircle the felloe of the wheel and a body portion sliding in the slot 22 centrally located in the head 12 of the jack (see Fig. 6). The body portion of the locking bolt is formed with a series of circumferential grooves 23 to receive the ratchet 24 of the locking lever 25 pivoted, as at 26, on lugs 27 formed on the lockplate 28 and forced by the expansion of spring 29 into engagement with the locking bolt when it is free to move. A lock 30 of the usual tumbler or multiple disc type is suitably mounted in the lock-plate 28 and carries at its rear extremity a cam disk 31 on the cam surface of which rides the arm 25ª of the locking lever. When the cam is turned by the key into locking position, as shown in Fig. 6, the arm 25ª can move inwardly sufficiently to permit the engagement of ratchet 24 with the grooves 23 of the locking bolt and is maintained in this position by spring 29. To release the ratchet 24 the cam disk 31 is turned by the key through a half-revolution, which causes the arm 25ª to swing inwardly as it rides on the cam surface and thus swings the locking lever 25 and its ratchet 24 out of engagement with the bolt 21. The bolt can then be manually lifted away from the wheel felloe and the jack removed from the wheel. The lock is then preferably turned to locking position permitting the ratchet 24 to engage a lower groove 23 to hold the locking bolt in its elevated position so that it cannot be accidentally lost from the jack. It will be noted that the spring 29 and locking lever 25 permits the lowering of the bolt 21 without changing the position of the cam disk from locking position (see Fig. 6) but prevents any upward movement of the bolt until such time as the cam disk is turned to swing the ratchet 24 out of engagement with the locking bolt. The lock-plate 28 carrying the lock 30 and locking lever 25 is riveted or otherwise permanently fastened upon the jack.

The operation of my improved jack is believed to be apparent. When it is desired to raise a wheel to change a tire, or for any other reason, the jack is taken from the tool box and passed through the wheel so that the body portion is between the wheel and car and the head 12 is then fitted into the crotch between two adjacent spokes that are then near a horizontal plane. The car is then backed, or driven forwardly, to carry the jack around until one of the feet 14 contacts the ground and then a little further movement carries the jack over an inclined position to a vertical one where both feet rest on the ground, this tilting movement of the jack operating from one foot as a fulcrum and raising the wheel and adjacent parts of the vehicle as it swings to a vertical position. When the tire has been changed and it is desired to lower the wheel again it is merely necessary to drive the car forwardly and the jack will swing away from its vertical position to an inclined one and then move around the wheel to a horizontal position, whence it can be readily removed from the wheel and returned to the tool box.

When it is desired to use the jack merely as a lock to discourage unauthorized use of the car the jack is inserted as above described between two spokes near a horizontal position and the bolt 21 pushed downwardly until the head 22 contacts the wheel felloe, the ratchet 24 thereupon preventing retraction of the bolt until the cam disk 31 is rotated by an appropriate key.

Should it happen that the driver encounter some roads with deep mud holes or a stretch of sand upon which it is difficult to secure effective traction, it is possible to use my improved jack as a mud hook or road gripper by simply inserting the jack into the crotch between two spokes, locking it in position, and driving the wheels around. The broad base of the jack will not readily pass through the mud or sand and will give sufficient purchase upon the road to send the car forwardly. A great advantage of the use of my improved jack as a mud hook is that it may be easily attached to the wheel by a person remaining on the running board, thus avoiding the discomfort of stepping into the mud attendant on the use of the usual mud hooks.

While it will be apparent that the illustrated embodiment of my invention herein disclosed is well calculated to adequately fulfill the objects primarily stated, it is to be understood that the invention is susceptible to variation, modification and change without departing from the spirit and scope of the invention as set forth in the appended claims.

Having described my invention I claim:—

1. A lockable wheel jack adapted to extend radially on opposite sides of the wheel felloe, the outer portion of the jack extending beyond the tire of the wheel and the inner portion into contact with adjacent spokes, a lock carried by the inner portion and provided with a locking bolt movable into and out of clamping engagement with the felloe when the lock is actuated.

2. A wheel jack comprising a tapered head portion adapted to fit between two spokes of the wheel, a curved body portion, and a base adapted to extend beyond the tire of the wheel and to be brought into contact with the ground and then into position elevating the wheel upon rotation of the wheel, the tapered head portion having concave sides to partially encircle the spokes and carrying a protective sheet of leather engaging the spokes, and means for holding and stretching the protective sheet relatively to the sides of the jack.

3. A lockable wheel jack having a tapered head portion adapted to fit between two spokes of the wheel, a base adapted to extend beyond the tire of the wheel, a locking bolt mounted in the head portion and adjustable into contact with the felloe of the wheel, a lock, and means controlled by the lock to prevent retraction of the locking bolt except when the lock is actuated.

4. A lockable wheel jack having a tapered head portion adapted to fit between two spokes of the wheel, a base adapted to extend beyond the tire of the wheel, a locking bolt mounted in the head portion and adjustable into contact with the felloe of the wheel, a lock and a locking lever controlled by the lock to prevent retraction of the locking bolt except when the lock is actuated.

5. A lockable wheel jack having a tapered head portion adapted to fit between two spokes of the wheel, a base adapted to extend beyond the tire of the wheel, a locking bolt mounted in the head portion and adjustable into contact with the felloe of the wheel, a lock, and a locking lever controlled by the lock and having a ratchet engaging the locking bolt to prevent retraction of the locking bolt except when the lock is actuated.

ZENAS B. CHASE.

Witnesses:
 REX FRYE,
 C. M. CUMMINGS.